Oct. 26, 1937.  L. W. LESSLER  2,097,197
FOLDING CAMERA
Filed Dec. 10, 1936
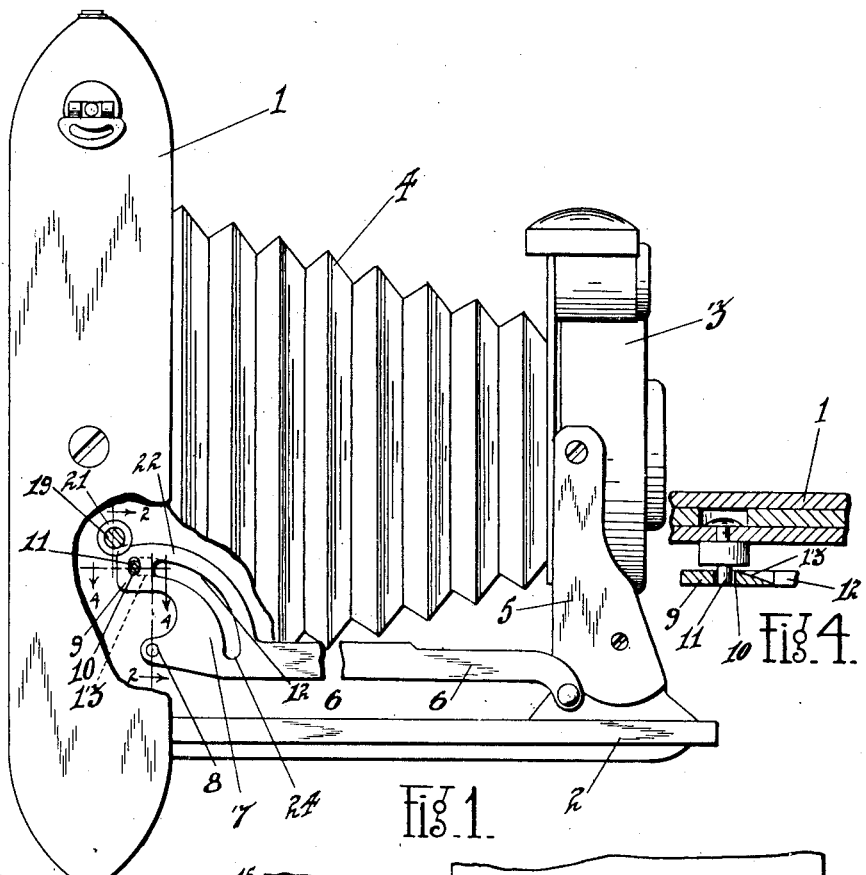
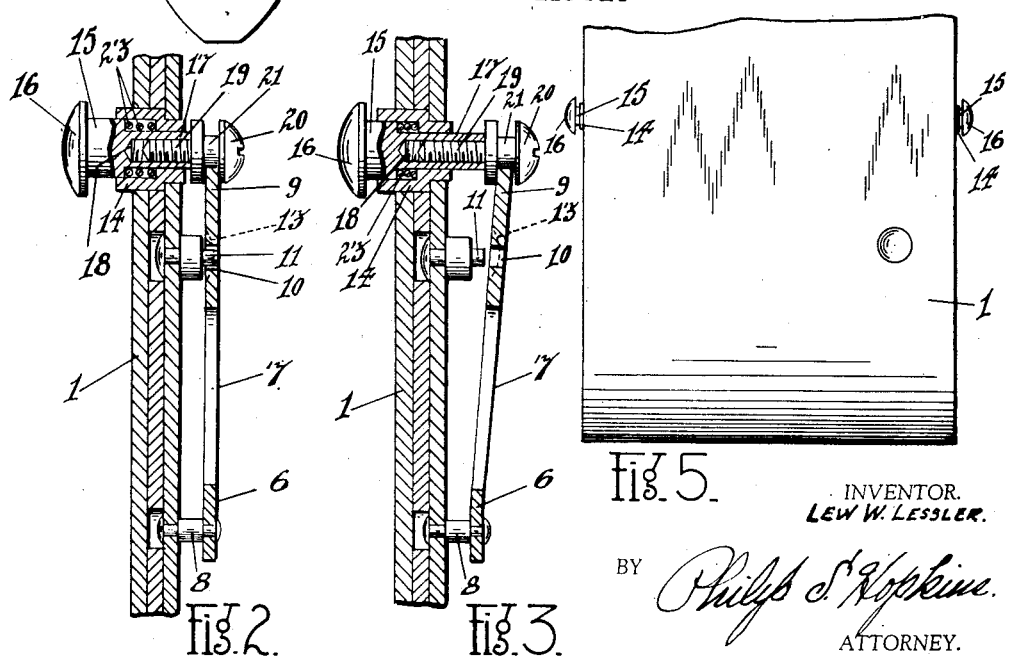
INVENTOR.
LEW W. LESSLER.
BY Philip S. Hopkins
ATTORNEY.

Patented Oct. 26, 1937

2,097,197

UNITED STATES PATENT OFFICE 2,097,197

FOLDING CAMERA

Lew W. Lessler, Johnson City, N. Y., assignor to Agfa Ansco Corporation, Binghamton, N. Y., a corporation of New York Application December 10, 1936, Serial No. 115,111

7 Claims. (Cl. 95—40)

My invention relates to improvements in a folding camera and has particular reference to a locking and releasing means for the bed or platform of a folding camera.

One of the principal objects of my invention lies in the provision of a locking and releasing device which is combined with the platform braces and camera front erecting arms.

It is a particular object of my invention to provide a means for positively locking the camera platform in its open position and for readily releasing the braces of such platform whereby the same may be folded or closed.

An important object of my invention lies in the provision of such a locking and releasing means which is mounted upon each side of the body of the camera for easy and ready manipulation by the fingers of the user.

My invention is an improvement upon that patented by Carl Bornmann, Lew W. Lessler, and Erich H. Heyer, U. S. Patent 2,005,820 dated July 25, 1935.

Other objects and advantages will be apparent as the description proceeds, reference being had to the figures of the accompanying drawing forming a part of this application and wherein like reference numerals indicate like parts.

In the drawing Figure 1 is a side view of a folding camera embodying my invention and with certain parts broken away for clearness of illustration.

Figure 2 is a detail cross sectional view of the locking and releasing means in the locking position, taken on the line 2—2 of Figure 1.

Figure 3 is a view similar to Figure 2 but showing the device in its releasing position.

Figure 4 is a detail sectional view of the locking and releasing device, taken on the line 4—4 of Figure 1.

Figure 5 is a partial view of the back of the camera equipped with my invention and showing the locking and release buttons on each side thereof.

The reference character 1 refers generally to the body of a folding camera to which is suitably pivoted in the usual manner the bed or platform 2 adapted to be moved to and from closed position with respect to the camera body. The platform supports the camera front 3 carrying the usual lens, shutter and view finder and which front is connected to the body of the camera by means of the usual flexible bellows 4.

Also connected with the camera front 3 on each side thereof are the erecting arms 5 suitably pivoted to the platform and to the front. Pivotally connected at their front ends with the erecting arms 5, and through such arms, with the forward end of the platform 2, are the braces 6, one on each side of the camera, which braces serve the dual function of erecting and folding means for the front 3 and as braces for the platform 2 in its open position. The rear ends of the braces 6 are enlarged as at 7 and are pivoted as at 8 to the side walls of the camera body.

The side walls of the body of the camera are shown in the cross section figures as being made up of laminated layers as in the case of metal camera construction. Such side walls will be referred to generally as the body of the camera, however, and designated by the reference character 1 and it will be understood that the same may be of a solid piece or of any other desired construction.

The upper portion of the enlarged part 7 of each of the braces 6 is provided with an extension 9 provided with an opening 10 adapted to be releasably engaged with a fixed stud or pin 11 projecting inwardly from the body of the camera at a point spaced substantially above the pivots 8 of the levers. The enlarged portion 7 of each of the braces 6 is also provided with arcuate shaped slot 12 adapted to receive the stud 11 during the opening and closing movement of the platform 2 and which serves to guide and stabilize the pivoting of the braces 6. The opening 10 is aligned with the rear end of the slot 12 and spaced slightly therefrom as shown clearly in Figures 1 and 4. The material of the brace between the end of the slot 12 and the opening 10 is grooved or recessed on a bevel as at 13, the lowest part of the groove being adjacent the end of the slot 12 and the high part of the groove terminating at the edge of the opening 10.

At a point adjacent the stud 11 each of the walls of the camera body 1 is provided with a hollow bushing 14 extending therethrough and serving as a guide journal for a slidable push button 15, the outer end of which projects outside of the camera body and is provided with a finger piece or head 16. The inner end 17 of each of the push buttons 15 is hollow and internally threaded as at 18 to receive the threaded screw portion of a pin 19 disposed inside of the camera body. This pin 19 is provided with an enlarged head 20 recessed around its periphery as at 21. The extreme upper end of the extension 9 of each of the levers 6 is adapted to engage in the recess 21 thus formed on each of the pins 19. It will be noted from Figure 1 that the enlarged portion 7 of each of the braces 6 is arcuately formed as at 22 and as the brace is rotated on its pivot 8, this arcuate edge 22 rides in and is guided by the recess 21 on the head 20 of the pin 19.

The head 20 of the pin 19 and the finger piece 16 on the push button 15 serve to limit the sliding movement of these parts inwardly and outwardly through the bushing 14. A coil spring 23 is disposed within the bushing 14 between a shouldered portion thereof and a shouldered portion of the push button 15, to normally urge the push button outwardly and thus permit the enlarged portion 7 of each of the braces 6 to assume its normal position in parallel alignment with the body of the camera, and in which position the stud 11 may engage either in the opening 10 or in the slot 12. Obviously, however, if the push button is pressed inwardly to the position shown in Figure 3, the engagement of the extension 9 of each of the braces 6 within the recess 21 causes such braces to be sprung inwardly an amount sufficient to disengage such brace from the stud 11. When the pressure is released on the push buttons, they resume their normal outward position under the influence of the springs 23 and the lever itself, preferably being made of spring-metal stock, will resume its normal position parallel with the side wall of the camera body.

The operation of my invention is as follows. Assuming the camera to be closed, that is with the platform 2 folded to its normal position against the body 1, the stud 11 will be disposed adjacent the inner end 24 of the slot 12. The arcuate edge 22 of the enlarged portion 7 of each of the braces will have its forward portion (that portion furthest away from the extension 9) engaged in the respective recesses 21 of the headed pins 19. The platform is generally secured in this closed position by any resilient latch means not shown and forming no part of this invention.

Upon lowering the platform 2 to open the camera for use, the braces 6 function to erect the front 3 and upon the downward movement of the braces to the position shown in Figure 1, the studs 11 ride within the slots 12 and the arcuate edges 22 ride in the recesses 21 to guide and stabilize the braces in their downward movement. When the rear end of each slot 12 reaches the stud 11, such stud rides upwardly along the bevelled groove 13 at the end of the slot until it reaches the opening 10 whereupon the stud enters such opening and the brace snaps back to normal position from the slightly laterally sprung position caused by the stud 11 engaging the bevelled groove 13. In this position the braces 6 are locked rigidly by means of the studs 11 and openings 10 and the camera front is in proper position for use. The cooperation of the studs 11 and the openings 10 provides a positive and rigid lock for the camera front and the platform 2 in the open position and the snapping of the extensions 9 of the braces 6 over the studs 11 when the full open position has been reached informs the user of the complete opening of the camera.

When it is desired to close the camera, the operator presses inwardly with thumb and finger on each of the push buttons 15 by means of the finger pieces 16 projecting on either side of the camera. In doing so the headed pins 19 with their recesses 21 serve to spring the extensions 9 of the braces 6 slightly inwardly to the position shown in Figure 3 to release the studs 11 from the openings 10. Thereupon the platform 2 may be started towards its folded or closed position and as soon as the openings 10 have moved beyond the studs 11, the pressure on the push buttons 15 may be released and the braces permitted to resume their normal position, the studs then entering the slots 12 and remaining therein during the rest of the closing operation.

It will thus be seen that I have provided an effective locking and releasing means for the braces and front erecting members of a folding camera, operable from the outside of the body of the camera. The detailed mechanism has been shown on one side of the camera only. It is understood of course that identical means is provided on each side. Of course changes may be made in details of construction and arrangement of parts without departing from the spirit and scope of my invention. I do not limit myself, therefore, to the exact form herein shown and described other than by the appended claims.

I claim:

1. A camera comprising a body and a platform hinged thereto, a brace pivotally connecting said body and said platform, a fixed locking pin on said body, said brace having an opening therein adapted to receive said pin for locking said brace and platform in open position, said brace being adapted to flex laterally to engage and disengage said pin, and means on said body for so flexing said brace.

2. A camera comprising a body and a platform hinged thereto, a brace pivotally connecting said body and said platform, a fixed locking pin on said body, said brace having an opening therein adapted to receive said pin for locking said brace and platform in open position, said brace being adapted to flex laterally to engage and disengage said pin, and means on said body for so flexing said brace, said means comprising a resilient push button supported in the wall of said body and extending to the outside thereof.

3. A camera comprising a body and a platform hinged thereto, a brace pivotally connecting said body and said platform, a fixed locking pin on said body, said brace having an extension on its end adjacent said body, said extension having an opening therein adapted to receive said pin for locking said brace and platform in open position, said brace and extension being adapted to flex laterally to engage and disengage said pin, and means on said body for so flexing said brace.

4. A camera comprising a body and a platform hinged thereto, a brace pivotally connecting said body and said platform, a fixed locking pin on said body, said brace having an extension on its end adjacent said body, said extension having an opening therein adapted to receive said pin for locking said brace and platform in open position, said brace and extension being adapted to flex laterally to engage and disengage said pin, and means on said body for so flexing said brace, said extension also having an arcuate slot therein for receiving said pin during the pivotal movement of said brace and in the closed position of said platform.

5. A camera comprising a body and a platform hinged thereto, a brace pivotally connecting said body and said platform, a fixed locking pin on said body, said brace having an extension on its end adjacent said body, said extension having an opening therein adapted to receive said pin for locking said brace and platform in open position, said brace and extension being adapted to flex laterally to engage and disengage said pin, and means on said body for so flexing said brace, said extension also having an arcuate slot therein for receiving said pin during the pivotal movement of said brace and in the closed position of said platform, said arcuate slot having one end adjacent said opening and in alignment therewith.

6. A camera comprising a body and a platform hinged thereto, a brace pivotally connecting said body and said platform, a fixed locking pin on said body, said brace having an extension on its end adjacent said body, said extension having an opening therein adapted to receive said pin for locking said brace and platform in open position, said brace and extension being adapted to flex laterally to engage and disengage said pin, and means on said body for so flexing said brace, said extension also having an arcuate slot therein for receiving said pin during the pivotal movement of said brace and in the closed position of said platform, said arcuate slot having one end adjacent said opening and in alignment therewith, the material between said opening and the adjacent end of said slot being bevelled to permit said pin to ride out of said slot and to snap into said opening when said platform is pivoted to full open position.

7. A camera comprising a body and a platform hinged thereto, a brace at each side thereof pivotally connecting the sides of said body and platform, a fixed locking pin on each side of said body, said braces each having an opening therein adapted to receive the adjacent pin for locking said braces and platform in open position, said braces being adapted to flex laterally to engage and disengage said pins, and means mounted on each side of said body for so flexing said braces.

LEW W. LESSLER.